United States Patent
Valentini et al.

(10) Patent No.: US 7,065,426 B2
(45) Date of Patent: Jun. 20, 2006

(54) METHOD OF EVALUATING THE EFFICIENCY OF AN AUTOMATIC MACHINE

(75) Inventors: Antonio Valentini, San Lazzaro Di Savena (IT); Fiorenzo Draghetti, Medicina (IT)

(73) Assignee: G. D Societa' per Azioni, Bologna (IT)

( * ) Notice: Subject to any disclaimer, the term of this patent is extended or adjusted under 35 U.S.C. 154(b) by 735 days.

(21) Appl. No.: 10/152,161

(22) Filed: May 21, 2002

(65) Prior Publication Data

US 2002/0188368 A1   Dec. 12, 2002

(30) Foreign Application Priority Data

May 25, 2001   (IT)   ............................ BO2001A0330

(51) Int. Cl.
*G06F 19/00* (2006.01)
(52) U.S. Cl. .................. 700/111; 700/109; 702/182
(58) Field of Classification Search ............... 700/109, 700/111
See application file for complete search history.

(56) References Cited

U.S. PATENT DOCUMENTS

| | | | |
|---|---|---|---|
| 5,044,379 A | 9/1991 | Cahill et al. ............... | 131/280 |
| 5,339,249 A | 8/1994 | Schaeffer ............... | 364/474.18 |
| 5,546,329 A | 8/1996 | Kurtzberg et al. ........... | 364/552 |
| 5,862,054 A | 1/1999 | Li ......................... | 364/468.28 |
| 2002/0099463 A1* | 7/2002 | Sakaguchi ................. | 700/111 |

FOREIGN PATENT DOCUMENTS

| | | |
|---|---|---|
| DE | 100 24 735 | 2/2001 |
| EP | 0448 044 | 9/1991 |
| WO | 00 70495 | 11/2000 |

OTHER PUBLICATIONS

English Abstract of DE 100 24 735 Dated Feb. 1, 2001.

* cited by examiner

*Primary Examiner*—Leo Picard
*Assistant Examiner*—Sheela S. Rao
(74) *Attorney, Agent, or Firm*—Ladas and Parry LLP

(57) ABSTRACT

A method of evaluating the efficiency of an automatic machine, whereby, upon completion of a given production lot, a current performance index achieved by the automatic machine during manufacture of the production lot is calculated; and the current performance index is memorized in a nonvolatile memory, together with various characteristic parameters relating to the processing performed. To evaluate the efficiency of the automatic machine, the current performance index is compared with historic performance indexes memorized previously during operation of the automatic machine and having characteristic parameters substantially similar to the characteristic parameters of the current performance index.

29 Claims, 1 Drawing Sheet

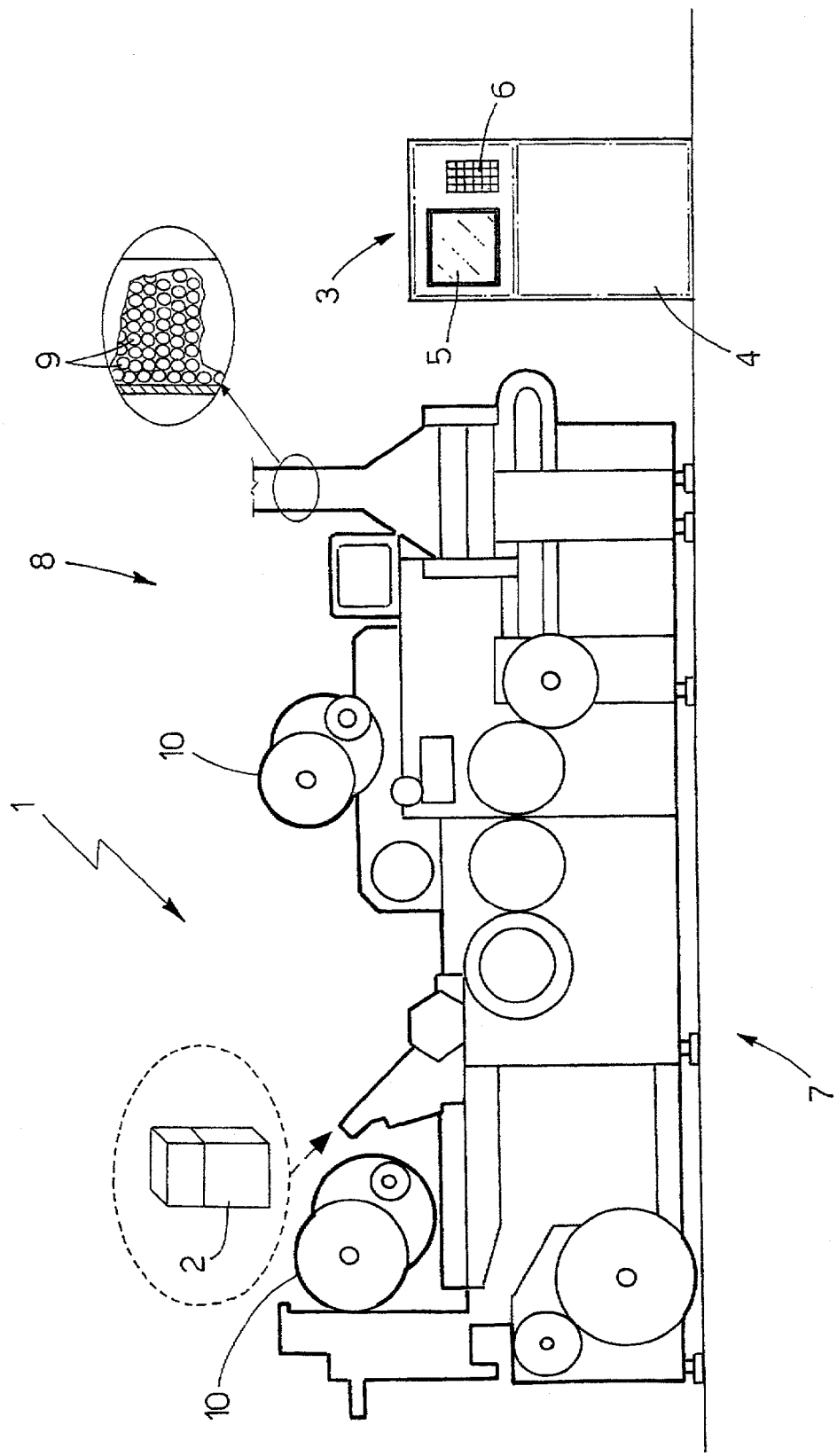

METHOD OF EVALUATING THE EFFICIENCY OF AN AUTOMATIC MACHINE

FIELD OF THE INVENTION

The present invention relates to a method of evaluating the efficiency of an automatic machine.

The present invention may be used to advantage on an automatic cigarette packing machine, to which the following description refers purely by way of example.

BACKGROUND OF THE INVENTION

Automatic cigarette packing machines are normally supplied together with a maker's table listing various machine performance indexes (e.g. output per hour, faults per hour, average downtime, etc.) and respective acceptance ranges. And to evaluate the efficiency of a machine, the user determines the actual value of one or more performance indexes, compares the actual value with the respective acceptance range indicated by the maker, and, in the event one or more performance indexes are outside the respective acceptance ranges, proceeds to program maintenance and/or inspection of the machine accordingly.

Though widely used by cigarette manufacturers, the above method of evaluating the efficiency of an automatic cigarette packing machine has been found to result, in some situations, in the programming and performance of substantially pointless maintenance and/or inspection work, and, in other situations, in the performance of maintenance and/or inspection work with a certain delay with respect to occurrence of the problem.

SUMMARY OF THE INVENTION

It is an object of the present invention to provide a method of evaluating the efficiency of an automatic machine, designed to eliminate the aforementioned drawbacks, and which at the same time is cheap and easy to implement.

According to the present invention, there is provided a method of evaluating the efficiency of an automatic machine for processing articles grouped into a succession of production lots; the method comprising calculating, upon completion of a production lot, a current performance index of the automatic machine achieved during production of said production lot; and the method being characterized by memorizing the current performance index in a nonvolatile memory, together with various characteristic parameters relating to the processing of said production lot; and evaluating the efficiency of the automatic machine by comparing the current performance index with at least one historic performance index memorized beforehand during operation of the automatic machine and having characteristic parameters substantially similar to the characteristic parameters of the current performance index.

BRIEF DESCRIPTION OF THE DRAWING

A non-limiting embodiment of the present invention will be described by way of example with reference to the accompanying drawing, the sole FIGURE of which is a schematic front view of a cigarette packing machine implementing the efficiency evaluation method according to the present invention.

DETAILED DESCRIPTION OF THE INVENTION

Number 1 in the accompanying drawing indicates as a whole an automatic packing machine for producing packets 2 of cigarettes, and which is of substantially known type, e.g. of the type manufactured by G.D. S.p.A. and marketed under the name "X500".

Packing machine 1 comprises a control unit 3 housed in a cabinet 4 located close to packing machine 1 and connected to packing machine 1 by electric cables (not shown).

Control unit 3 also performs the functions of a user-interface or so-called "HMI" device, and therefore incorporates a known industrial computer comprising a data display screen 5, and a keying device 6 normally defined by a keyboard and/or pointing device. Alternatively, keying device 6 may be integrated in screen 5 by means of a so-called "touch-screen" function.

In a further embodiment, control unit 3 comprises a network connection—typically operating according to the Ethernet standard—by which a known remote user-interface device (not shown) can interact with control unit 3.

Packing machine 1 comprises a number of known operating devices 7 (not shown singly), each for performing a given function, and which may comprise, for example, transfer conveyors (typically wheels), gumming devices, movable folding devices, embossing devices, control sensors, etc.

In actual use, packing machine 1 receives, at the input, a number of materials 8—in particular, a stream of cigarettes 9, and sheets of wrapping material unwound off reels 10—which are processed by operating devices 7 to obtain packets 2 of cigarettes at the output of packing machine 1.

Production of packets 2 of cigarettes is normally divided into production lots, each comprising a given number of packets 2 of cigarettes of a given homogeneous type, so that two successive lots may differ as to the type of packets 2 of cigarettes. Packets 2 of cigarettes may be of numerous types, and may differ, for example, as to the type of wrapping material employed (in particular, the graphics imprinted on the wrapping material); the size of packets 2 of cigarettes; the arrangement of cigarettes 9 inside each packet 2 of cigarettes; and the size of cigarettes 9.

To produce each type of packet 2 of cigarettes, packing machine 1 must be set to a respective operating configuration corresponding to a given configuration of operating devices 7; and, when the type of packet 2 of cigarettes changes from one production lot to the next, the operating configuration of packing machine 1 must also be changed, as is known, by making given technical adjustments or changes to at least some of operating devices 7 of packing machine 1.

For each production lot, or each fraction of the same production lot, control unit 3 determines a performance index I of packing machine 1 representing a synthetic estimate of the overall performance of packing machine 1 during manufacture of the lot considered.

Performance index I is defined by a vector of four numeric variables V1, V2, V3, V4, wherein variable V1 is an indicator of the quality of packets 2 of cigarettes produced by packing machine 1; variable V2 an indicator of the productivity of packing machine 1; variable V3 an indicator of the downtime of packing machine 1; and variable V4 an indicator of the state of operating devices 7 of packing machine 1.

In another embodiment, performance index I is defined by a single numeric variable V normally obtained by mathematically combining the above four numeric variables V1, V2, V3, V4. In an alternative embodiment, performance index I is obtained by calculating a weighted average of variable V1 (quality of packets 2 of cigarettes), variable V2 (productivity), and variable V4 (state of operating devices 7).

Each packet 2 of cigarettes produced on packing machine 1 undergoes various optical quality control checks at a known control station (not shown) located along a known output conveyor (not shown) of packing machine 1. Each quality control check of a packet 2 of cigarettes provides for measuring the value of a respective characteristic quantity of the packet 2 of cigarettes; comparing the measured value with a corresponding reference value; and rejecting the packet 2 of cigarettes if the deviation between the measured value and reference value is outside a given acceptance range. The value of variable V1 of each packet 2 of cigarettes is determined by calculating a weighted average of the percentage deviations between the measured values and respective reference values; and the value of the overall variable V1 of an entire production lot is obviously determined by calculating the average of the variable V1 values of each packet 2 of cigarettes forming part of the production lot.

The value of variable V2 of a production lot is determined by subtracting from the number of packets 2 of cigarettes produced per unit of time the number of packets 2 of cigarettes rejected per unit of time, both of which numbers are normally recorded on known cigarette packing machines. A respective correction coefficient, depending on the quality of materials 8 supplied to packing machine 1, may be applied to the final value of variable V2, and is preferably a multiplication coefficient of 0 to 1, which assumes a value 1 when the quality of materials 8 is excellent, and a value of less than 1 (normally not less than 0,9) when the quality of materials 8 is less than optimum.

The value of variable V3 of a production lot is determined by dividing total downtime of the machine by total operating time, both of which times are normally recorded on known cigarette packing machines.

The value of variable V4 is determined by calculating a weighted average of the state indicators of each operating device 7; and the state of each operating device 7 is in turn determined as a function of the actual lifetime of operating device 7, or by calculating a weighted average of a first contribution depending on the lifetime of operating device 7, and a second contribution depending on the estimated condition of operating device 7.

The first contribution is determined by dividing the actual lifetime of operating device 7 by the estimated lifetime of operating device 7. The estimated lifetime is provided by the maker of operating device 7, and may be corrected as a function of the average lifetime achieved by the same type of operating device 7 on packing machine 1.

The second contribution is determined as a function of control signals acquired by direct or indirect measurements on packing machine 1. More specifically, the second contribution is determined according to the formula:

$$SC = |Cc3 - Ccci|/Vrm$$

where:

SC is the second contribution;

Cc3 is the current condition of operating device 7 estimated from the currently acquired control signals of operating device 7;

Ccci is the initial condition of operating device 7 deduced from the control signals of operating device 7 acquired after installation and set-up;

Vrm is the maximum |Cc3−Ccci| difference value recorded in previous cases of replacement and/or failure of operating device 7.

In actual use, at the end of a production lot or a fraction of it, control unit 3 automatically and independently calculates the current performance index I achieved by packing machine 1 during manufacture of the production lot; memorizes the current performance index I in a known nonvolatile memory (not shown) together with various characteristic parameters relating to processing of the production lot; and searches its memory for historic performance indexes I memorized previously during normal operation of packing machine 1, and having characteristic parameters substantially similar to those of the current performance index I. To evaluate the efficiency of packing machine 1 in the manufacture of the production lot in question, the current performance index I is compared with the historic performance indexes I having characteristic parameters substantially similar to those of the current performance index I.

On detecting a significant difference between the current performance index I and historic performance indexes I, control unit 3 generates an operator control request signal.

In a preferred embodiment, characteristic production lot parameters comprise the type of packets 2 of cigarettes forming part of the production lot; the quality of materials 8 supplied to packing machine 1 to process the production lot; and mean ambient conditions (typically temperature and humidity) during processing of the production lot.

To enable as consistent a comparison as possible between current and historic performance indexes I, the historic performance index I may be corrected by applying a respective correction coefficient depending on the difference between the characteristic parameters of the current performance index I and those of the historic performance index I.

Though cheap and easy to implement, the above method of evaluating the efficiency of packing machine 1 in the manufacture of a given production lot is highly effective, by taking into account not only factors extraneous to packing machine 1—such as the type of packets 2 of cigarettes, the quality of input materials 8, and ambient conditions—but also features peculiar to packing machine 1 itself, which as a whole inevitably differs from any other machine of the same model. Such difference are caused by construction tolerances and by the life of packing machine 1 (use, maintenance, changes in set-up, repairs), and may eventually become highly significant.

The invention claimed is:

1. A method of evaluating the efficiency of an automatic machine for processing articles (2) grouped into a succession of production lots; the method comprising the steps of:

calculating, upon completion of a production lot, a current performance index (I) of the automatic machine (1) achieved during production of said production lot;

memorizing the current performance index (I) in a nonvolatile memory, together with various characteristic parameters relating to the processing of said production lot;

finding in the nonvolatile memory at least one historic performance index (I) memorized beforehand during operation of the automatic machine (1) and having characteristic parameters similar to the characteristic parameters of the current performance index (I); and evaluating the efficiency of the automatic machine (1) by comparing the current performance index (I) only with the historic performance index (I) having characteristic parameters similar to the characteristic parameters of the current performance index (I).

2. A method as claimed in claim 1, and comprising the further step of estimating a first correction coefficient as a function of the difference between said characteristic parameters of the current performance index (I) and said characteristic parameters of the historic performance index (I); said comparison of the current performance index (I) and the historic performance index (I) being corrected by means of the first correction coefficient.

3. A method as claimed in claim 1, and comprising the further step of generating a control request signal in the event said current performance index (I) differs with respect to said historic performance index (I).

4. A method as claimed in claim 1, and comprising the further step of evaluating the efficiency of the automatic machine (1) by comparing the current performance index (I) with an average of the historic performance indexes (I) having characteristic parameters similar to the characteristic parameters of the current performance index (I).

5. A method as claimed in claim 1, wherein each said performance index (I) is defined by a numeric variable.

6. A method as claimed in claim 1, wherein each said performance index (I) is defined by a vector of numeric variables (V1, V2, V3, V4).

7. A method as claimed in claim 5, wherein each article (2) produced on the automatic machine (1) is subjected to at least one quality control check; one said numeric variable (V1) being an indicator of the quality of the articles (2) produced on the automatic machine (1).

8. A method as claimed in claim 7, wherein each article (2) produced on the automatic machine (1) is subjected to a number of quality control checks; each quality control check comprises the steps of:
measuring the value of a respective characteristic quantity of the article (2),
comparing said measured value with a corresponding reference value, and
rejecting the article (2) if the deviation between the measured value and the reference value is outside a given acceptance range;
said quality indicator of each article (2) being determined by calculating a weighted average of the percentage deviations between the measured values and the respective reference values.

9. A method as claimed in claim 5, wherein one said numeric variable (V2) is a productivity indicator.

10. A method as claimed in claim 9, wherein said productivity indicator is determined by subtracting from the number of articles (2) produced per unit of time the number of articles (2) rejected per unit of time.

11. A method as claimed in claim 9, to said productivity indicator is applied a second correction coefficient depending on the quality of the materials supplied to the automatic machine (1).

12. A method as claimed in claim 5, wherein one said numeric variable (V3) is a machine downtime indicator.

13. A method as claimed in claim 12, wherein said machine downtime indicator is determined by dividing total machine downtime by total operating time.

14. A method as claimed in claim 1, wherein said characteristic parameters of a said production lot comprise the type of said articles (2) forming part of the production lot.

15. A method as claimed in claim 1, wherein said characteristic parameters of a said production lot comprise the characteristics of the materials (8) supplied to the automatic machine (1) to process the production lot.

16. A method as claimed in claim 1, wherein said characteristic parameters of a said production lot comprise mean ambient conditions during processing of the production lot.

17. An automatic machine comprising: a control unit (3) implementing the efficiency evaluation method as claimed in claim 1 and performing said efficiency evaluation automatically upon completion of each said production lot.

18. An automatic machine for processing cigarettes, and comprising: a control unit (3) implementing the efficiency evaluation method as claimed in claim 1 and performing said efficiency evaluation automatically upon completion of each said production lot.

19. A method of evaluating the efficiency of an automatic machine comprising a number of operating components (7) and for producing articles (2) from raw materials (8) supplied at the input; the method comprising the steps of:
calculating a numeric estimate of the state of an automatic machine (1);
estimating an indicator of the quality of the articles (2) produced,
estimating an indicator of the productivity of the automatic machine (1),
estimating an indicator of a state of the operating components (7) of the automatic machine (1) by calculating a weighted average of the indicators of the state of each said operating component (7); and
calculating said numeric estimate of the state of the automatic machine (1) by calculating a weighted average of the indicator of the quality of the articles (2) produced, of the productivity indicator, and of the indicator of the state of the operating components (7).

20. A method as claimed in claim 19, comprising subjecting each article (2) produced on the automatic machine (1) to a number of quality control checks, each of which comprises measuring the value of a respective characteristic quantity of the article (2), comparing said measured value with a corresponding reference value, and rejecting the article (2) if the deviation between the measured value and the reference value is outside a given acceptance range; said quality indicator of each article (2) being determined by calculating a weighted average of the percentage deviations between the measured values and the respective reference values.

21. A method as claimed in claim 19, wherein said productivity indicator is determined by subtracting from the number of articles (2) produced per unit of time the number of articles (2) rejected per unit of time.

22. A method as claimed in claim 21, wherein said productivity indicator is multiplied by a correction coefficient depending on the quality of the materials (8) supplied to the automatic machine (1).

23. A method as claimed in claim 19, wherein said state of each operating component (7) is used in determining the indicator of the state of the operating components (7) and is estimated as a function of an actual lifetime of the component.

24. A method as claimed in claim 23, wherein said state of an operating component (7) is determined by dividing the actual lifetime of the operating component (7) by an estimated lifetime of the operating component (7).

25. A method as claimed in claim 24, wherein said estimated lifetime of each operating component (7) is determined by correcting data supplied by the maker of the operating component (7) by an average life achieved by the same type of operating component (7) on the automatic machine (1).

26. A method as claimed in claim 19, wherein, for a number of operating components (7), a condition is estimated as a function of control signals acquired by direct or indirect measurements on said automatic machine (1); said state of an operating component (7) being determined by calculating a weighted average of a first contribution depending on the lifetime of the component, and of a second contribution depending on the estimated condition of the component.

27. A method as claimed in claim 26, wherein said first contribution is determined by dividing the actual lifetime of said operating component (7) by an estimated lifetime of the operating component (7).

28. A method as claimed in claim 27, wherein said estimated lifetime of each operating component (7) is determined by correcting the data supplied by the maker of the operating component (7) by the average life achieved by the same type of component (7) on the automatic machine (1).

29. A method as claimed in claim 26, wherein said second contribution is determined by applying the following formula:

$$SC = |C_{c3} - C_{cci}|/V_{rm}$$

where:

SC is the second contribution;

$C_{c3}$ is the current condition of the operating component (7) estimated from the currently acquired said control signals of the operating component (7);

$C_{cci}$ is the initial condition of the operating component (7) deduced from said control signals of the operating component (7) acquired after installation and set-up; and $V_{rm}$ is the maximum $|C_{c3} - C_{cci}|$ difference value recorded in previous cases of replacement and/or failure of the operating component (7).

* * * * *